United States Patent [19]
Fleischman

[11] Patent Number: 5,414,199
[45] Date of Patent: May 9, 1995

[54] APPARATUS AND METHOD FOR TWO-STAGE OXIDATION OF WASTES

[75] Inventor: Scott D. Fleischman, Aiken, S.C.

[73] Assignee: The United States of America as represented by the United States Department of Energy, Washington, D.C.

[21] Appl. No.: 127,364

[22] Filed: Sep. 28, 1993

[51] Int. Cl.$^6$ ............................................. F26B 20/00
[52] U.S. Cl. ..................... 588/204; 588/209; 588/213; 588/216; 588/228; 204/151; 204/257
[58] Field of Search ............... 588/204, 209, 213, 216, 588/228; 204/151, 257

[56] References Cited

U.S. PATENT DOCUMENTS

| | | | |
|---|---|---|---|
| 3,793,171 | 2/1974 | Zabolotny et al. | 204/130 |
| 4,582,613 | 4/1986 | Kenney et al. | 588/209 |
| 4,685,220 | 8/1987 | Meenan et al. | 588/209 |
| 4,749,519 | 6/1988 | Koehly et al. | 252/627 |
| 4,874,485 | 10/1989 | Steel | 204/130 |
| 4,910,001 | 3/1990 | Kitachara et al. | 423/210 |

OTHER PUBLICATIONS

Amy C. Almon, "Electrolytic Destruction of Spent Tributylphosphate Extractant Using Silver Catalyzed Electrochemical Oxidation" Nov. 1990.

Primary Examiner—John Niebling
Assistant Examiner—Arun S. Phasge
Attorney, Agent, or Firm—Brian R. Tumm; Harold M. Dixon; William R. Moser

[57] ABSTRACT

An apparatus and method for oxidizing wastes in a two-stage process. The apparatus includes an oxidation device, a gas-liquid contacting column and an electrocell. In the first stage of the process, wastes are heated in the presence of air to partially oxidize the wastes. The heated wastes produce an off-gas stream containing oxidizable materials. In the second stage, the off-gas stream is cooled and flowed through the contacting column, where the off-gas stream is contacted with an aqueous acid stream containing an oxidizing agent having at least two positive valence states. At least a portion of the oxidizable materials are transferred to the acid stream and destroyed by the oxidizing agent. During oxidation, the valence of the oxidizing agent is decreased from its higher state to its lower state. The acid stream is flowed to the electrocell, where an electric current is applied to the stream to restore the oxidizing agent to its higher valence state. The regenerated acid stream is recycled to the contacting column.

8 Claims, 1 Drawing Sheet

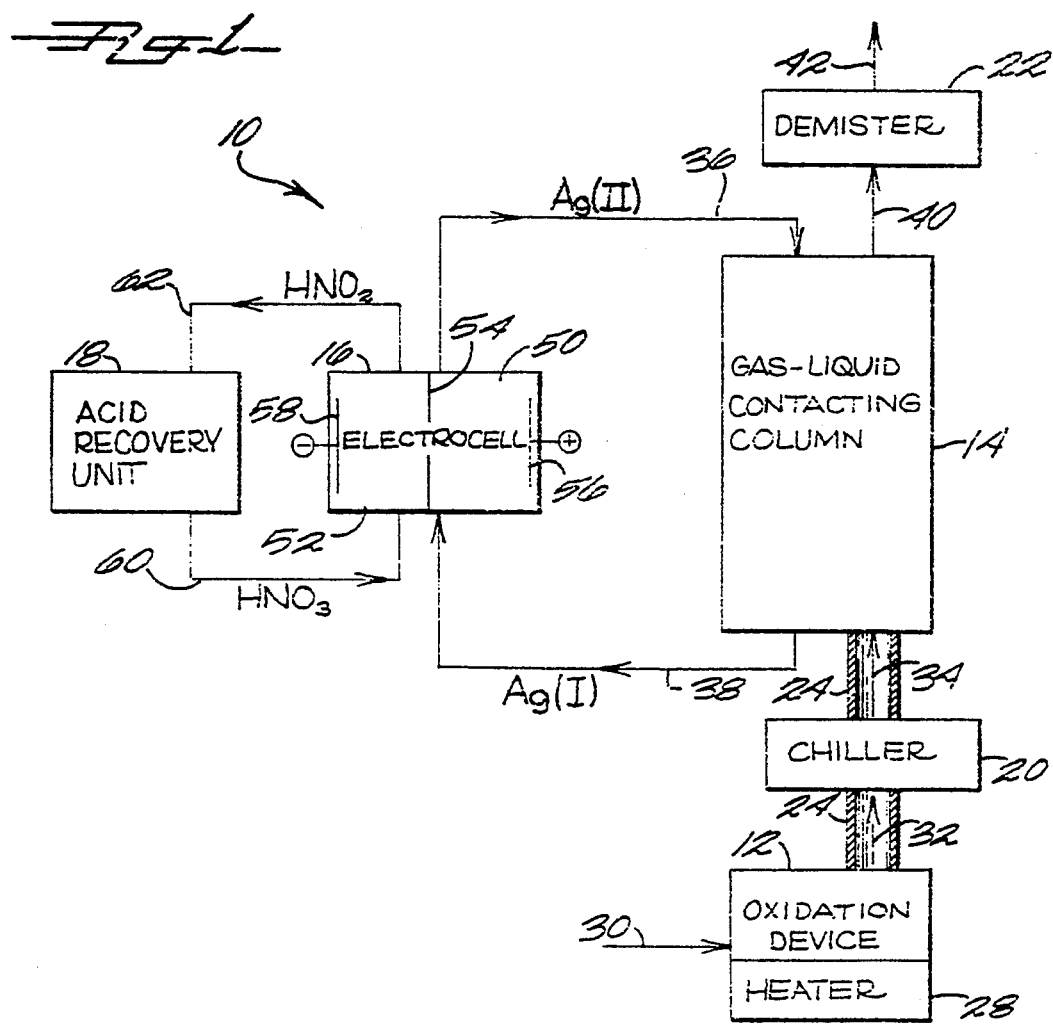

APPARATUS AND METHOD FOR TWO-STAGE OXIDATION OF WASTES

BACKGROUND OF THE INVENTION

1. Field of the Invention

The present invention relates to the oxidation of wastes. In particular, the present invention relates to an apparatus and method for two-stage oxidation of wastes. The United States Government has rights in this invention pursuant to Contract No. DE-AC0989SR18035 between the U.S. Department of Energy and Westinghouse Savannah River Company.

2. Discussion of Background

Many industrial processes generate wastes in the form of aqueous waste streams, sludge solids, aqueous supernate, incinerator ash, incinerator off-gas condensate, and so forth. The cost of disposal in landfills, once the most economic method for getting rid of wastes, has greatly increased because of increased documentation and permitting requirements, transportation costs and handling costs, and has acquired a considerable contingency cost because of uncertainties about the advisability and durability of land disposal of wastes.

Many types of waste materials can and are detoxified before disposal. Wastes that contain hazardous organics such as halogenated hydrocarbons, dioxins, phenols, and so forth present significant environmental disposal problems unless they are detoxified. Incineration only partly destroys the hazardous constituents of many wastes. In addition, volatile organics may escape into the atmosphere. Byproducts of incineration include bottom ash, aqueous incinerator offgas condensate (blowdown), or mixtures of ash and offgas condensate, all of which may contain residual hazardous substances.

Electrochemical oxidation processes are also used to treat wastes. Thus, Kenney, et al. (U.S. Pat. No. 4,582,613) add copper (II) oxide to an aqueous feed stream containing toxic materials such as cyanide, hydrocarbons, halogenated hydrocarbons, and dioxins. The stream is reacted under elevated pressure and temperature conditions to oxidize the toxic materials to less toxic or innocuous compounds.

Silver is a known agent for oxidizing organic compounds. Kitahara, et al. (U.S. Pat. No. 4,910,001) disclose a composition for cleaning a gas that contains a toxic component such as arsine, phosphine, monosilane, diborane, and hydrogen selenide. The composition comprises pellets formed of manganese dioxide and cupric oxide, having deposited thereon a silver compound such as silver (I) oxide or silver (II) oxide. Steele (U.S. Pat. No. 4,874,485) adds organic wastes to an aqueous electrolyte comprising nitric acid and containing Ag(I) as a primary oxidizing species. The electrolyte is heated to a temperature above 50° C. to produce Ag(II) ions which decompose the wastes. Zabolotny, et al. (U.S. Pat. No. 3,793,171) place a gas stream that carries oxidizable impurities in contact with an aqueous acid stream containing an electrolytically regenerable oxidizing agent (Ag(II)). After a sufficient contact time to remove oxidizable impurities from the gas stream, the gas stream is removed from the contact area and vented or further treated as desired. The aqueous acid stream is removed from the contact area, the oxidizing agent is regenerated, and the cycle is repeated.

Ionic oxidizing agents, particularly Ag(II) ions, are known to oxidize many organic and inorganic compounds rapidly and effectively. However, electrochemical oxidation using Ag(II) is not cost-effective due to the large amounts of power required to produce the Ag(II) ions. Treating many types of wastes using currently available technology is expensive and requires a substantial commitment of resources. There is a need for a simple, relatively cost-effective way to treat oxidizable wastes.

SUMMARY OF THE INVENTION

According to its major aspects and broadly stated, the present invention is an apparatus and method for oxidizing wastes in two stages. The apparatus includes an oxidation device, a gas-liquid contacting column and an electrocell. First, the wastes are heated in a source of oxygen, such as air, to oxidize at least part of the wastes and produce an off-gas stream that may still contain additional oxidizable materials. After the off-gas stream cools, it is pumped through the contacting column where the gas stream comes into contact with an aqueous acid stream containing an oxidizing agent having higher and lower positive valence states. At least a portion of the oxidizable materials in the off-gas stream are transferred to the acid stream. As the transferred materials oxidize, the valence of the oxidizing agent decreases from a higher state to a lower state. Then the "spent" oxidizing agent in the acid stream is transferred to the electrocell where it is regenerated for recycle in the contacting column.

Separating the oxidation process into two stages constitutes an important feature of the present invention. By separating it into two stages, partial oxidation of the wastes, especially organic constituents thereof, by heating in the first stage can significantly reduce the amount of material to be oxidized electrochemically in the second stage, significantly reducing material and power requirements for the second stage.

Another feature of the present invention is the ability to regenerate the oxidizing agent. The valence state of the oxidizing agent is decreased as a result of the second-stage electrochemical oxidation process, that is, an oxidizing agent such as Ag(II) is reduced to Ag(I), Co(III) to Co(II), and so forth, but is then returned to its higher valence state using an electric current. Therefore, the agent can be reused as long as there is sufficient current.

Yet another feature of the present invention is the choice of heat for the first stage of oxidation. Although not an ideal means for oxidizing by itself, heat does provide an inexpensive and simple oxidant to reduce the amount of unoxidized waste for the second, more expensive stage.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a schematic view of an apparatus according to a preferred embodiment of the present invention.

DETAILED DESCRIPTION OF A PREFERRED EMBODIMENT

The present invention is an apparatus and two-stage method for oxidizing wastes. The apparatus includes an oxidation device, a gas-liquid contacting column and an electrocell. In the first stage of the process, the wastes are at least partially oxidized by heating in the oxidation device. The heated wastes produce an off-gas stream that may still contain oxidizable materials. The off-gas stream is allowed to cool and then pumped through the contacting column where the gas stream is placed in contact with an aqueous acid stream containing an oxidizing agent. The remaining oxidizable materials are oxidized by the oxidizing agent. As a result of oxidizing these materials, the valence of the oxidizing agent is reduced and the acid, "spent." The spent acid stream is pumped to the electrocell where the oxidizing agent is electrolytically regenerated, then recycled to the contacting column.

Referring now to FIG. 1, there is shown a schematic view of an apparatus according to a preferred embodiment of the present invention. Apparatus 10 includes an oxidation device 12, a gas-liquid contacting column 14, an electrocell 16, and an acid recovery unit 18. Oxidation device 12 is a device adapted for heating wastes in the presence of oxygen (air), such as a rumace or incinerator. If desired, heating may take place in the presence of a catalyst to promote the oxidation of wastes in device 12. An off-gas duct 24 connects oxidation device 12 and contacting column 14. Apparatus 10 may include a chiller 20 operatively connected to off-gas duct 24, such as a heat exchanger, and a filter or demister 22 to cool the partially oxidized wastes from device 12, or the wastes may be allowed to cool naturally.

A waste stream 30 enters oxidation device 12, where the wastes are heated by heater 28. At least a portion, and preferably a major portion if not all of the constituents of waste stream 30 are oxidized in device 12. The heated wastes produce an off-gas stream 32, containing heated air, carbon dioxide, carbon monoxide, and various materials that may not have been oxidized by the heat but which can be oxidized and whose composition depends on the composition of input waste stream 30. Off-gas stream 32 exits device 12 through off-gas duct 24, is pumped through chiller 20, and the then-cooled off-gas stream 34 is transferred to contacting column 14.

In column 14, off-gas stream 34 contacts an aqueous acid stream 36. Stream 36 contains an oxidizing agent having higher and lower positive valence states, as will be described below. The remaining oxidizable materials in gas stream 34 are transferred to acid stream 36, where substantially all of the transferred materials are destroyed by the action of the oxidizing agent. The oxidation of these materials reduces the valence state of the oxidizing agent in the acid and the acid is eventually "spent," that is, it has been reduced to the point where it is no longer effective and the oxidizing agent must be regenerated or replaced.

The output of column 14 includes a spent acid stream 38 and an oxidized, "cleansed," gas stream 40. Spent acid stream 38 is pumped to electrocell 16, where the stream is electrolytically regenerated; that is, an electric current is used to remove electrons from the oxidizing agent and thereby restore its higher valence state.

Electrocell 16 may be the type of electrocell known in the art, having an anode compartment 50 and a cathode compartment 52 separated by a porous membrane 54. An anode 56 and a cathode 58 are disposed in anode compartment 50 and cathode compartment 52, respectively. A nitric acid stream 60 flows from acid recovery unit 18 to cathode compartment 52; a nitrous acid stream 62 flows from compartment 52 to unit 18. Anode 56 and cathode 58 are connected to a suitable power supply, as indicated schematically in FIG. 1.

Spent acid stream 38 enters anode compartment 50 and nitric acid stream 60 enters cathode compartment 58. The oxidizing agent is regenerated at anode 56 and nitric acid is reduced to nitrous acid at cathode 58 by well known processes. The output of electrocell 16 includes acid stream 36, containing the regenerated oxidizing agent, and nitrous acid stream 62. Stream 62 is transferred to acid recovery unit 18, where the nitrous acid is regenerated to nitric acid, for example, by blowing air through the stream. Stream 36 is transferred to contacting column 14.

Cleansed gas stream 40 exits contacting column 14 and is vented to the atmosphere. Gas stream 40 may contain air, water, carbon dioxide and other nontoxic byproducts, depending on the composition of input waste stream 30. Alternatively, gas stream 40 is passed through demister 22 before being vented as gas stream 42.

Contacting column 14 is configured to provide a large contact area between off-gas stream 34 and acid stream 36 to insure satisfactory mass transfer. During the period of contact in column 14, oxidizable materials in gas stream 34 are dissolved in acid stream 36, or adsorbed or absorbed by stream 36. Column 14 is preferably a packed column containing an appropriate packing material, including but not limited to polypropylene, polyethylene or ceramic packing materials. Alternatively, column 14 may be a bubble column or a packed bed such as are known in the art. In order to better transfer matter between off-gas stream 34 and acid stream 36, stream 34 preferably flows counter to stream 36. If desired, off-gas stream 32 may be input directly to contacting column 14. However, the off-gas is preferably cooled by chiller 20 or other suitable means to aid in condensing volatile organic species into acid stream 36.

The operating temperature range of apparatus 10 is between the freezing and boiling points of the acid stream, but preferably at or near room temperature (about 22° C.) to aid in condensing volatile organic species into acid stream 36. Apparatus 10 is preferably operated at atmospheric pressure.

Aqueous stream 36 serves as the carrier for the oxidizing agent. An acid stream is required for electrolytic regeneration in electrocell 16, since the oxidation capability of the oxidizing agent is essentially destroyed in a neutral stream. Stream 36 is preferably strongly acidic with a pH no greater than about one. Acid stream 36 may be obtained, for example, by adding suitable acids to an aqueous stream containing the oxidizing agent. The acid must not itself react with the oxidizing agent. In addition, the acid must be water soluble and have a vapor pressure that is low enough to avoid excessive vaporization during operation of apparatus 10 (and the venting of entrained acid droplets with gas stream 40). Nitric acid is preferable for use with the present invention, although other acids such as sulfuric acid, phosphoric acid, perchloric acid, and mixtures thereof may be used if desired. Acid stream 36 preferably has an acid concentration within the range of approximately 4M–10M. Acid stream 36 most preferably has a concentration of approximately 8M. (The term "M" is used herein in its usual sense, that is, a 1M solution contains one mole of the solute in one liter of solution.)

The oxidizing agent accepts electrons during oxidation of the materials transferred from off-gas stream 34, reducing its valence from a higher to a lower positive state. The agent must have a sufficiently high oxidation potential to accept electrons from a wide range of common wastes and be restorable to its higher valence state by electrolytic regeneration. Suitable oxidizing agents include metals which exhibit at least two different valence states, such as cobalt (III/II), chromium (VI/III), manganese (III/II), cerium (IV/III), and especially silver (II/I). Silver in the +2 valence state (Ag(II)) is highly reactive and effectively oxidizes a wide range of organic and inorganic compounds. Ag(II) is reduced to Ag(I) during oxidation. Electrocell 16 produces Ag(II) from Ag(I) at a rate at least sufficient to balance the rate of oxidation by Ag(II).

The optimum concentration of the oxidizing agent in acid stream 36 depends on the acid, the choice of oxidizing agent, and the types and mounts of wastes to be treated. Where the oxidizing agent is Ag(II) and the acid is nitric acid, Ag(II) concentration in acid stream 36 is preferably at least approximately 0.01M and most preferably in the approximate range of 0.1M–0.5M. Ag(II) and Ag(I) are both present in the process stream during operation of apparatus 10. Silver can be added to the acid stream in any form that dissolves in water to give Ag(I), or in any form that reacts with nitric acid to produce Ag(I). When compared to the Ag(II) concentration in incoming acid stream 36, the Ag(II) concentration in spent acid stream 38 is depleted by an amount depending on the types and amounts of materials oxidized. The Ag(II) concentration of acid stream 38 is regenerated in electrocell 16.

Oxidation device 12 may process wastes continuously or batchwise. The volume of acid stream 36 and the concentration of oxidizing agent contained therein, the flow rates of the process streams in apparatus 10 (streams 34, 36, 38, 40), the contact area provided by column 14, the capacity of electrocell 16, the amount of power supplied to electrocell 16, and so forth, are determined in view of the volume of off-gas stream 34 and the types and amounts of materials contained therein. By way of example, the volume and concentration of acid stream 36, its flow rate and the amount of oxidizing agent contained therein must be sufficient to transfer and treat the materials contained in gas stream 34. Preferably, off-gas is produced by device 12 at a rate that can be continuously treated by acid stream 36. The dimensions and configuration of the components of apparatus 10 are best determined by a modest degree of computation and experimentation for each particular system.

Oxidation begins in oxidation device 12, where wastes are heated in the presence of oxygen. Once waste materials are transferred from off-gas stream 34 into acid stream 36, oxidation continues. Thus, some transferred materials may be oxidized in contacting column 14. Acid stream 38 may contain residual oxidizable materials, some of which may be oxidized by the remaining Ag(II) ions before stream 38 reaches electrocell 16. In addition, some oxidizable materials may be destroyed in electrocell 16 as a result of the electric current passing through the cell to regenerate the oxidizing agent. The oxidizing agent is continuously regenerated in electrocell 16, however, both the oxidizing agent and other materials used with apparatus 10 may become depleted with extended use. Fluid may be lost by evaporation or by electrolysis in cell 16, the acid concentration may need to be adjusted, or additional silver may need to be added.

Because at least some, and preferably most, oxidation occurs in device 12, the amount of material to be oxidized electrochemically is greatly decreased. Using the highly effective, but power-intensive, electrochemical oxidation process to treat only the off-gases produced by device 12 rather than the entire waste load significantly reduces the size of equipment and power needed for the overall process.

An apparatus and method according to the present invention may be used to process any oxidizable materials, including many common wastes. Treatable materials include common wastes such as paper, fabric, rubber, cellulose, plastics, and various solvents; and compounds such as ketones, aldehydes, alcohols, amines, esters, ethers, and aliphatic, aromatic and halogenated hydrocarbons. The method is useful for treating toxic organic and inorganic compounds, such as cyanides, metal-cyanide complexes, thiocyanates, thiosulfates, halogenated hydrocarbons, phenolic compounds and dioxins.

It will be apparent to those skilled in the art that many changes and substitutions can be made to the preferred embodiment herein described without departing from the spirit and scope of the present invention as defined by the appended claims.

What is claimed is:

1. An apparatus for oxidizing wastes, said apparatus comprising:
    a first container for said wastes, said first container having an interior, an entrance and an exit;
    means for heating said wastes in said container, oxidizing a first portion of said wastes, leaving unoxidized a second portion of said waste, said heating means producing an off-gas stream containing said first portion and said second portion of said waste;
    an off-gas stack having a first end in communication with said exit of said first container and a second end, said stack receiving said off-gas stream from said first container;
    a second container having an interior, an entrance in communication with said second end of said off-gas stack and an exit, said second container receiving said off-gas stream from said stack; and
    an oxidizing agent in said second container, said oxidizing agent mixing with said second portion of said waste to oxidize said second portion, said oxidizing agent having a higher and a lower valence state, said oxidizing agent being reduced from said higher state to said lower valence state as said oxidizing agent oxidizes said second portion.

2. The apparatus as recited in claim 1, wherein said oxidizing agent is in an aqueous acid stream having a pH no greater, than approximately 1.0 and a concentration in the approximate range of 4M–10M, and said apparatus further comprising means for restoring said oxidizing agent from said lower valence state to said higher valence state.

3. The apparatus as recited in claim 1, wherein said oxidizing agent is Ag(II).

4. The apparatus as recited in claim 1, further comprising means for cooling said off-gas, said cooling means in thermal communication with said off-gas stack.

5. The apparatus as recited in claim 1, wherein said oxidizing agent is Ag(II), wherein said oxidizing agent is in an aqueous acid stream having a pH no greater than approximately 1.0 and a concentration in the approximate range of 4M–10M, said apparatus further comprising means for restoring said oxidizing agent from said lower valence state to said higher valence state.

6. The apparatus as recited in claim 1, further comprising means for cooling said off-gas, said cooling means in thermal communication with said off-gas stack, and wherein said oxidizing agent in said second container is in an aqueous acid stream having a pH no greater than approximately 1.0 and a concentration in the approximate range of 4M–10M, said apparatus further comprising means for restoring said oxidizing agent from said lower valence state to said higher valence state.

7. The apparatus as recited in claim 1, further comprising means for cooling said off-gas, said cooling means in thermal connection with said off-gas stack, and wherein said oxidizing agent is Ag(II).

8. The apparatus as recited in claim 1, further comprising means for cooling said off-gas, said cooling means in thermal communication with said off-gas stack, and wherein said oxidizing agent is Ag(II), and wherein said oxidizing agent in said second container is in an aqueous acid stream having a pH no greater than approximately 1.0 and a concentration in the approximate range of 4M–10M, said apparatus further comprising means for restoring said oxidizing agent from said lower valence state to said higher valence state.

* * * * *